United States Patent
Huffman

(10) Patent No.: US 6,698,178 B1
(45) Date of Patent: Mar. 2, 2004

(54) SAND TRAP RAKE AND STORAGE APPARATUS

(76) Inventor: David Huffman, 210 Kiowa Dr. East, Lake Kiowa, TX (US) 76240

( * ) Notice: Subject to any disclaimer, the term of this patent is extended or adjusted under 35 U.S.C. 154(b) by 0 days.

(21) Appl. No.: 09/995,833

(22) Filed: Nov. 29, 2001

Related U.S. Application Data

(60) Provisional application No. 60/250,128, filed on Dec. 1, 2000.

(51) Int. Cl.⁷ .................................................. A01D 7/00
(52) U.S. Cl. ................... 56/400.04; 56/400.19
(58) Field of Search ................... 56/400.04, 400.19, 56/400.2; 294/19.2, 19.1, 50.9, 65.5; 220/484, 501

(56) References Cited

U.S. PATENT DOCUMENTS

| | | | | |
|---|---|---|---|---|
| 1,370,086 A | * | 3/1921 | Callison | 56/400.19 |
| 1,469,957 A | * | 10/1923 | Rich | 172/372 |
| 1,548,906 A | * | 8/1925 | Schroer | 56/400.19 |
| 2,098,609 A | * | 11/1937 | Bishop | 294/51 |
| 2,110,538 A | * | 3/1938 | Walsh | 56/400.19 |
| 2,436,631 A | * | 2/1948 | Cohn | 47/41.1 |
| 2,804,109 A | * | 8/1957 | Fatica | 30/308.1 |
| 2,821,834 A | * | 2/1958 | Walker | 56/400.19 |
| 3,541,727 A | * | 11/1970 | Carlson | 47/41.1 |
| 3,584,739 A | * | 6/1971 | Erichson et al. | 206/349 |
| 3,614,149 A | * | 10/1971 | Clark | 294/19.2 |
| 4,461,357 A | * | 7/1984 | Kolb et al. | 172/373 |
| 4,476,939 A | * | 10/1984 | Wallace | 172/374 |
| 4,535,908 A | * | 8/1985 | Dabich | 220/484 |
| 4,565,398 A | * | 1/1986 | Poulin | 294/52 |
| 4,593,520 A | * | 6/1986 | Krizman | 56/400.06 |
| 4,635,987 A | * | 1/1987 | Hurtgam | 294/19.2 |
| 4,934,550 A | * | 6/1990 | Cash | 220/484 |
| 5,232,256 A | * | 8/1993 | Forbes | 294/19.1 |
| 6,170,112 B1 | * | 1/2001 | Mayfield et al. | 15/159.1 |
| 6,223,926 B1 | * | 5/2001 | Craven et al. | 220/484 |
| 6,405,891 B1 | * | 6/2002 | Christensen et al. | 220/484 |

FOREIGN PATENT DOCUMENTS

| | | | | |
|---|---|---|---|---|
| GB | 1600603 A | * | 10/1981 | A01D/7/00 |
| GB | 2073563 A | * | 10/1981 | A01B/1/00 |
| GB | 2260473 A | * | 4/1993 | A01D/7/00 |

* cited by examiner

*Primary Examiner*—Árpád Fab Kovács
(74) *Attorney, Agent, or Firm*—Krieg DeVault Lundy LLP

(57) ABSTRACT

A sand trap rake and storage apparatus, wherein a tubular storage compartment is sized to receive the sand trap rake therein. The tubular storage compartment is buried in the ground near a sand trap, so that the open top of the storage unit is above ground. A cover secures the sand trap rake in the tubular storage compartment. A compression spring pushes the rake above the top portion of the tubular storage unit for ease of access. The sand trap rake includes a head pivotally attached to the handle. A hand knob tightens the head against the handle in a first operating position perpendicular to the handle, and the hand knob is loosened to position the head in a second storage position parallel to the handle.

18 Claims, 4 Drawing Sheets

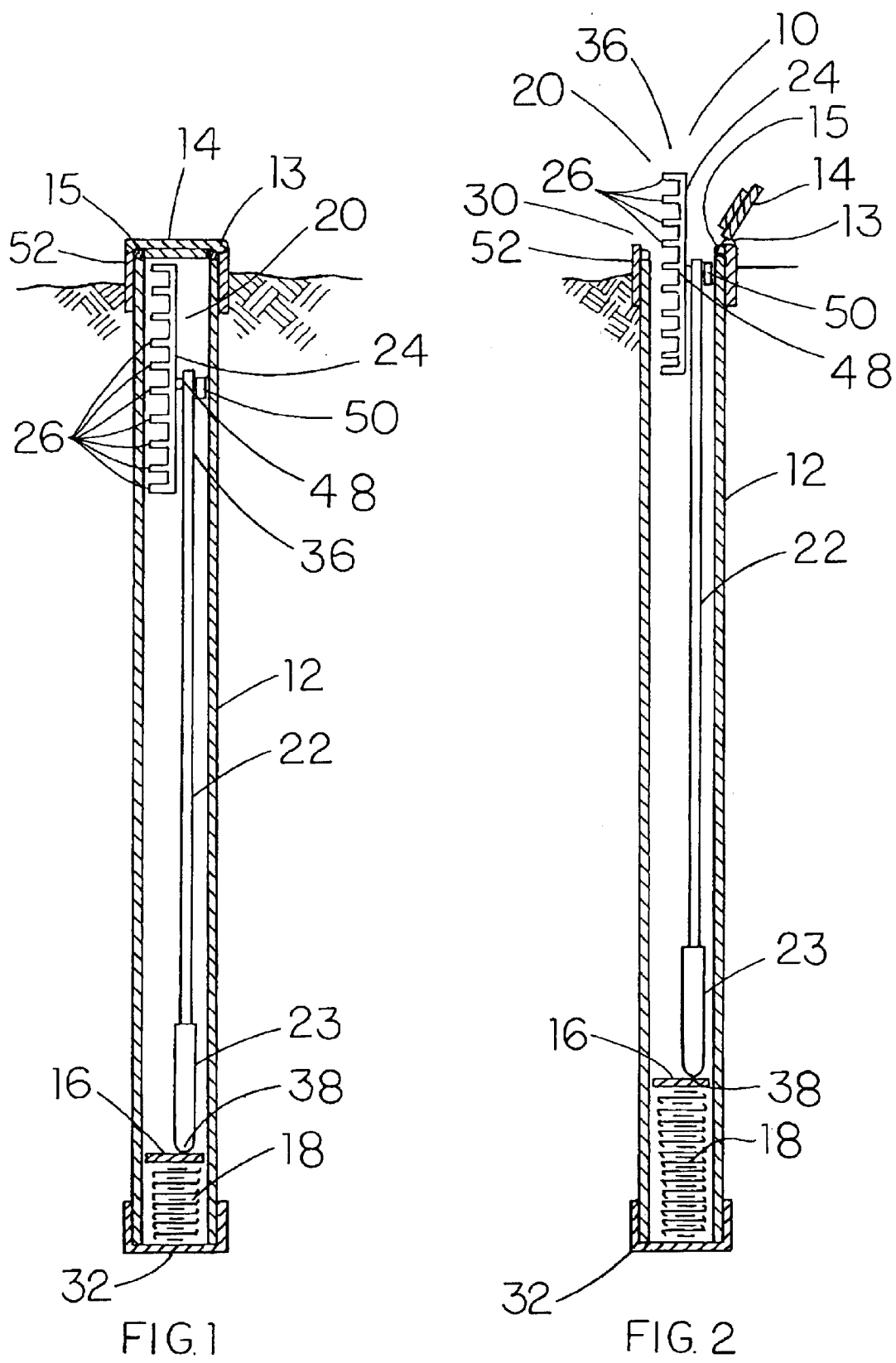

SAND TRAP RAKE AND STORAGE APPARATUS

This utility patent application claims priority of provisional patent application 60/250,128 filed Dec. 1, 2000, and this provisional patent application is incorporated by reference herein.

BACKGROUND OF THE INVENTION

This invention relates to a combination sand trap rake and storage apparatus for use at golf courses, and more specifically to a tubular storage compartment for use near golf course sand traps, and a sand trap rake designed to fit within the tubular storage compartment.

Golf courses are customarily designed with sand traps located around the greens as hazards to play. In playing a ball from a sand trap, the golfer leaves footprints and a divot in the sand, which must be smoothed out before leaving the hole. Out of courtesy to other players, after a golfer has cleared their ball from the sand trap, the golfer is expected to leave the sand trap in the same undisturbed condition as when the golfer found it. Consequently, to help a golfer smooth over the sand trap, most golf courses provide one or more ordinary garden rakes at each sand trap.

Although these rakes are usually satisfactory for smoothing the sand, they have many undesirable attributes when they are not in actual use. For example, the rakes are simply left on the ground alongside the trap, which is not aesthetically pleasing in relation to the picturesque appearance of the golf course. Additionally, the rakes present an undesirable hazard in that they may interfere with the normal roll of a golf ball in play. Course maintenance is also impeded by having to move the rake when the course is being mowed. Furthermore, a rake may present a personal safety hazard to an inattentive golfer if it is lying on the ground with its tines pointing upwards.

To overcome these problems it would be desirable to remove the rakes from view and from potential interference with play when the rakes are not in actual use. Unfortunately, conventional rakes are difficult to store in a concealed manner due to their long handles and right-angle heads. Additionally, when concealing the sand trap rake, the place of concealment should be obvious enough for the golfer to find, and yet blend in with the appearance of the golf course. Finally, if the means for concealing the sand trap rake is to be effective, it must be easy and convenient for the golfer to use.

U.S. Pat. No. 3,584,739 issuing to Erichson on Jun. 15, 1971 discloses a golf course sand trap rake and container. The container is buried in the ground adjacent to a sand trap for storage and concealment of the rake. A spring loaded support raises the handle to assist a golfer in grabbing the handle of the rake when a trap door of the unit is opened. The rake has a head portion parallel with the handle, requiring the user to move the rake in an awkward side to side direction as opposed to the conventional back and forth direction.

U.S. Pat. No. 4,934,550 issuing to Cash on Jun. 19, 1990 discloses a rake storage system in which a rake is concealed, but not covered, in a container buried in a golf course. The container is designed to receive a conventional style rake.

U.S. Pat. No. 5,042,812 issuing to Tillman on Aug. 27, 1991 discloses a rake storage system for use in close proximity to golf course sand traps that includes a storage tube inserted into the ground and a rake whose handle slides into the tube so that only the head of the rake is exposed when the rake is stored.

U.S. Pat. No. 2,436,631 issuing to Cohn on Feb. 24, 1948 discloses a ground mounted, spring actuated vessel with a closing and sealing cover.

SUMMARY OF THE INVENTION

This invention provides a tubular storage compartment for use near golf course sand traps, and a sand trap rake having a pivoting head designed to adjustably fit parallel with the handle in a storage position, or perpendicular with the handle in an operating position. The tubular storage compartment is sized to receive the sand trap rake therein. The tubular storage compartment is buried in the ground near a sand trap, so that the open top portion of the storage unit is above ground. A cover closes to secure the sand trap rake in the tubular storage compartment. A compression spring pushes the rake above the top portion of the tubular storage unit for ease of access. The sand trap rake includes a head with a threaded post that pivotally attaches to the handle. A hand knob tightens the head against the handle in a first operating position perpendicular to the handle, and the hand knob is loosened to position the head in a second storage position parallel to the handle.

It is an object of the invention to provide a sand trap rake and storage apparatus that is positioned relative to the ground in a manner that does not interfere with normal play or course maintenance.

It is also an object of the invention to provide a sand trap rake and storage apparatus that is generally concealed from view due to the nature of its shape, size and orientation, but which is obvious to a golfer who treads near or in a sand trap.

It is also an object of the invention to provide a sand trap rake that is designed to fit within the storage tube, when the rake is not being used, and to thus eliminate a potential safety hazard.

It is further an object of the invention to provide a sand trap rake that is designed to fit within the tubular storage compartment, and to partially raise from the tubular storage compartment when the cover on the tubular storage compartment is opened.

It is also an object of the invention to provide a sand trap rake designed to fit within the storage tube that is convenient and easy for a golfer to use.

In the broader aspects of the invention, the tubular storage compartment has a closed bottom, and is buried into the ground near a golf course sand trap in a vertical orientation so that the top of the storage apparatus is generally above the surface of the ground. The storage apparatus includes a cover that may be manually opened to insert or retrieve a sand trap rake, or closed in order to store the rake out of view. The storage unit contains a vertically oriented spring attached to its bottom, the spring pushing up against the handle to partially raise the handle above the top of the tubular storage compartment.

The rake includes a head attached to the handle that is oriented perpendicularly to the handle in a first operating position, at which time the rake is used in a conventional back and forth direction. In a second stored position, the head is rotated parallel to the handle for storage. When the cover is unfastened and opened in order to retrieve the rake, the potential energy of a spring is released, partially raising the sand trap rake. A golfer may easily grasp the rake for use in the adjoining sand trap.

BRIEF DESCRIPTION OF THE DRAWINGS

The above-mentioned and other features and objects of the invention and the manner of attaining them will become more apparent and the invention itself will be better understood by reference to the following description of embodiments of the invention taken in conjunction with the accompanying drawings wherein:

FIG. 1 is a side sectional view of the storage apparatus containing the sand trap rake in a closed position according to a preferred embodiment of the present invention.

FIG. 2 is a side sectional view of the storage apparatus shown in FIG. 1. with the top opened and the sand trap rake partially raised for ease of access.

DETAILED DESCRIPTION OF THE PREFERRED EMBODIMENT

Figure 3:
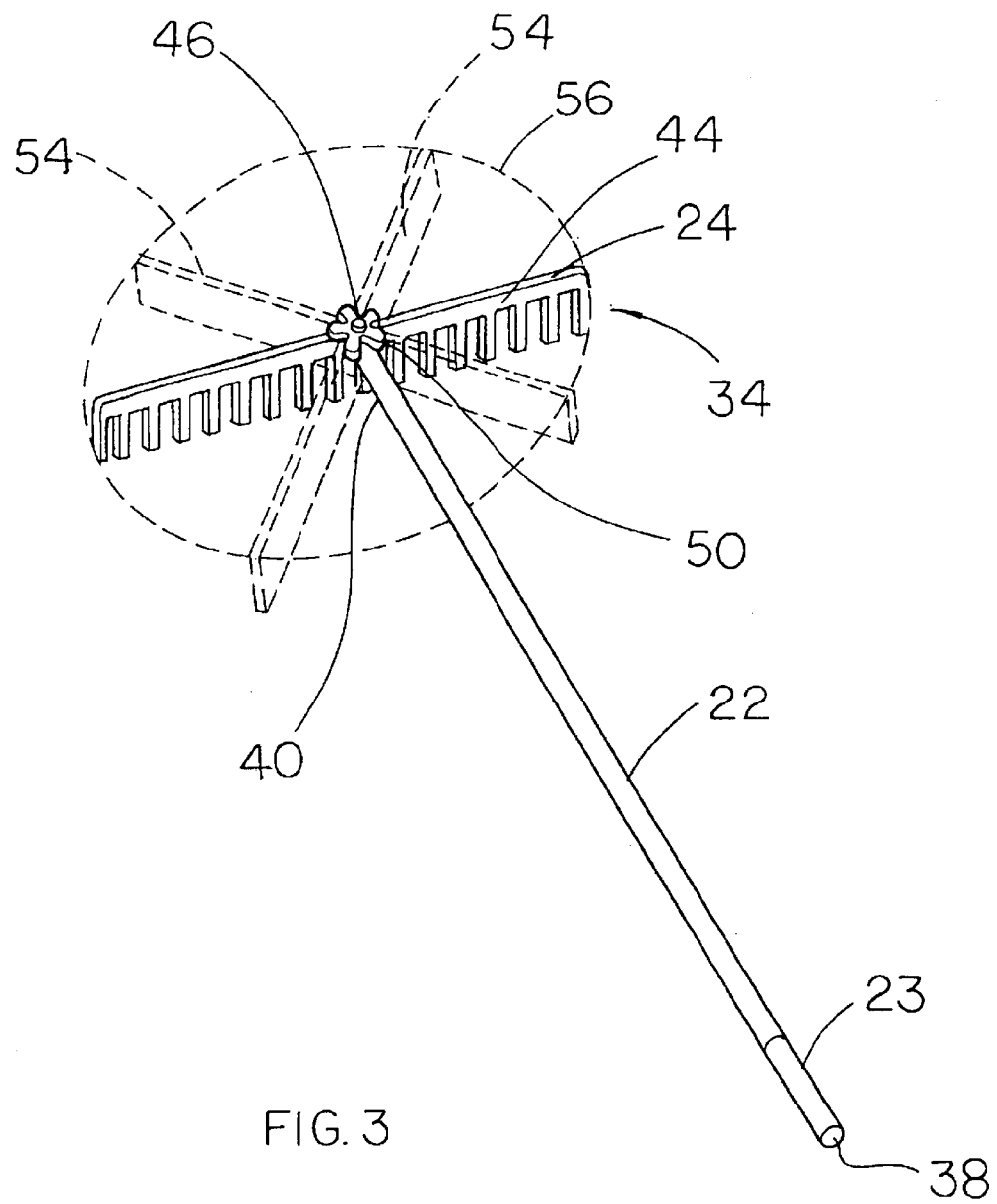
FIG. 3 is a perspective view of the sand trap rake in a first operational position (in bold lines) wherein the rake head is perpendicular to the handle and alternate operational positions (in dashed lines).

Referring now to the drawings FIG. 1 through FIG. 5, wherein like reference numerals refer to like parts, there is shown a sand trap rake and tubular storage apparatus 10, preferably comprising PVC tubing 12, having an open top end 30 and a closed bottom end 32. The tubing 12 may be of various shapes, sizes and lengths depending on the dimensions of the sand trap rake 20 to be stored.

A cover 14 is attached to the edge of the open top end 30 of the tubular storage compartment 12. The cover 14 is preferably made of PVC material. A hinge means 13 pivotally secures the cover 14 to the open top end 30 of the tubular storage compartment 12. An O-ring seal 15 is preferably provided around the edge of the open top end 30, between the cover 14 and open top end 30 of the tubular storage compartment 12, in order to form a tighter seal upon closing and releasably securing the cover 14, which aids in keeping unwanted moisture and debris from entering the tubular storage compartment 12. Various mechanisms for releasably securing the cover 14 to the open top end 30 of the tubular storage compartment 12 are well known in the art, and are intended to fall within the scope of this specification and the following claims.

As best shown in FIG. 1 and FIG. 2, a compressible spring 18 is positioned adjacent to the closed end 32 of the tubular storage compartment 12. A spring top 16 is preferably located directly adjacent to the spring 18, and is slidably positioned in the tubular storage compartment 12 to partially bias the handle 22 of the sand trap rake 20, to raise the sand trap rake 20 above the open top end 32 of the tubular storage compartment 12, when the cover 14 is opened.

Figure 4:
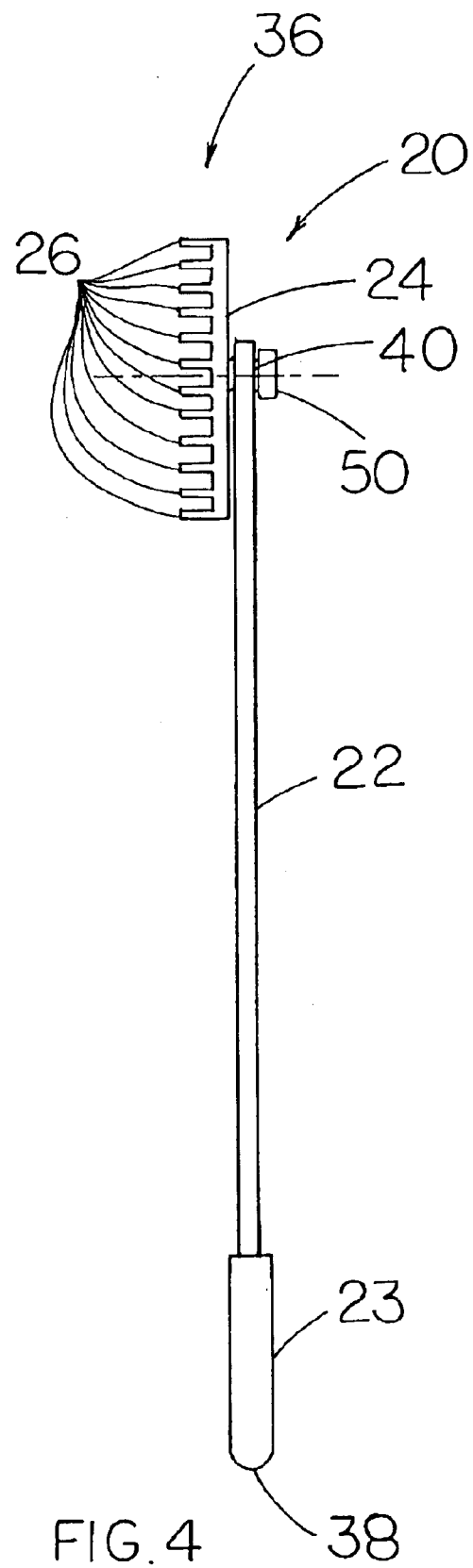
FIG. 4 is a side view of the sand trap rake shown in second stored position, wherein the rake head is parallel to the handle.

FIG. 3 and FIG. 4 show details of the sand trap rake 20. The sand trap rake 20 comprises a handle 22, preferably with a textured grip 23 at the grip end 38 of the handle 22. An aperture 42 extends through the handle 22 at the head end 40 of the handle 22. The aperture 42 extends perpendicular to the length of the handle.

A rake head 24 has a base portion 44, with a plurality of spaced, parallel tines 26 positioned perpendicular to the rake head 24. The rake head 24 has a threaded post 46 extending from the midpoint 48 of the base portion 44, on the side opposite the plurality of tines 26. The threaded post 46 is sized to pass through the aperture 42 on the handle 22.

Figure 5:
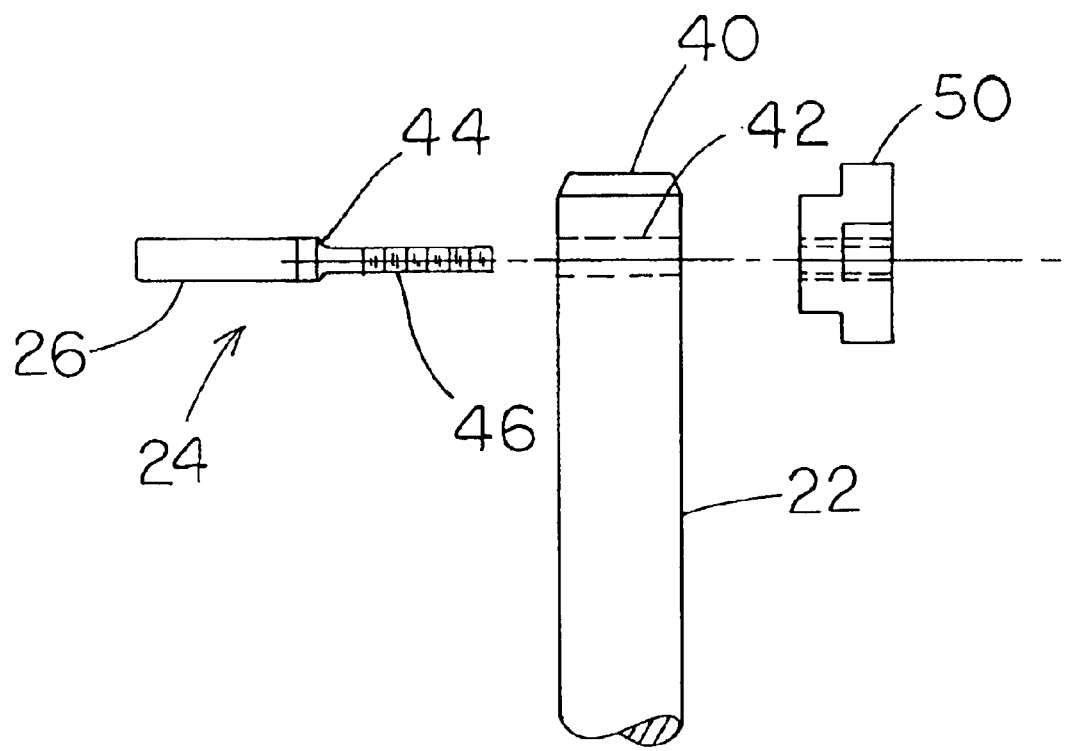
FIG. 5 is an exploded view showing the threaded post on the rake head positioned for insertion into an aperture in the handle. Also shown is a hand knob positioned for threaded engagement with the threaded post.

FIG. 5 is an exploded view showing the threaded post 46 on the rake head 24 positioned for insertion into an aperture 42 in the handle 22. Also shown is a hand knob 50 positioned for threaded engagement with the threaded post 46. The hand knob 50 is loosened to rotate the rake head 24 between a first operating position 34 with the tines 26 positioned perpendicular to the length of the handle 22 and a second storage position 36 with the tines positioned parallel with the length of the handle 22.

Operating position 34 and storage position 36 represent opposite ends of the spectrum of positions that may be selected by a user of the rake 20. As shown in FIG. 3 and FIG. 4, the rake head 24 may be selectively secured in any position along the complete arcuate range 56 of positions possible in relation to the handle 22 by rotating the head 24 about the threaded post 46 in the aperture 42 when the hand knob 50 is loosened. When the desired operating position is reached, whether perpendicular to the handle 22 or at an acute or obtuse angled position 54 to the handle 22 the hand knob 50 is tightened to secure the rake head 24 in that position in relation to the handle 22. As a result, a user of the rake may position the rake head 24 at an angle of less than or more than perpendicular in relation to the handle 22. This sand trap rake 20 may thus be secured at any desired angled position 54 between first operating position 34 and storage position 36, including angles in both directions away from perpendicular to suit both left and right handed players.

The tines 26 make contact with the sand when in a first operating position 34, enabling the golfer to smooth the sand in the sand trap with a natural push and pull motion. Upon completion of smoothing the sand, the hand knob 50 is loosened, and the rake head 24 is rotated parallel with the handle 22. The hand knob 50 is tightened to secure the rake head 24 in the storage position 36, in preparation for insertion of the sand trap rake into the tubular storage container 12.

The sand trap rake 20 may be made of metal, plastic or wood, or combinations thereof. The dimensions for the sand trap rake 20 may vary in accordance with respect to ergonomic and manufacturing considerations. The sand trap rake 20 is sized to fit within the storage tubing 12, when the head 24 is rotatably positioned in a second storage position 36 with the head 24 parallel to the handle 22. The head 24 is connected to the handle 22 by the threaded post 46, which extends through the aperture 42 in the head end 40 of the handle 22. The hand knob 50 is selectively loosened to pivot the rake head 24 in relation to the handle 22.

Once positioned, the hand knob 50 is tightened to secure the rake head 24 to the handle 22. In this way, the rake head 24 is selectively positioned as needed to accomplish the task of raking the sand, even when the sand extends into a crevice too narrow to fit the rake head 24, when the rake head 24 is perpendicular to the handle 22.

The storage tubing 12 is preferably buried into the ground near a sand trap (not shown) in a vertical orientation so that the top of the storage tube 12 is substantially level or slightly above the surface of the ground.

During operation of the sand trap rake 20, hand knob 50 is loosened, and the head 24 is rotated, to position the rake head 24 in a first operating position 34, with the head 24 perpendicular to the handle 22. Once in position, the hand knob 50 is tightened to secure the rake head 24 in relation to the handle 22. In the first operating position 34, sand in the sand trap may be smoothed out using a comfortable back and forth motion.

When the sand trap rake 20 is to be stored in the tubular storage container 12, the hand knob 50 is loosened and the rake head 24 is rotated to a second storage position 36, parallel to the handle 22. Once positioned, the hand knob 50 is tightened, securing the rake head 24 in the storage position 36. The hand knob 50 threadably engages the threaded post 46 which extends from the base portion 44 of the rake head 24. The hand knob 50 is loosened to enable the rake head 24 pivot about the aperture 42 in the handle 22. When the desired raking position is reached, the hand knob 50 is tightened to secure the rake head 24 in the desired position in relation to the handle 22.

In order to store the rake in the tube tubular storage compartment 12, the sand trap rake 20 is preferably inserted lengthwise, grip first, into the tubular storage compartment 12. The sand trap rake 20 is then pushed down into the tubular storage compartment 12, with the grip 23 of the handle 22 pushing down on the spring top 16, thereby compressing the spring 18. Once the entire length of the sand trap rake 20 is inserted into the tubular storage compartment 12, the cover 14 is pivoted closed about a hinge 13, so as to cover the open top end 30 of the tubular storage compartment 12. The cover 14 is then releasably secured to the open end 30 of the tubular storage compartment 12, with a suitable releasable fastening means 52.

This creates a certain potential energy in the spring 18, resulting in a constant stored-up force directed upwards through the handle 22, and against the cover 14. When the cover 14 is opened, the handle partially extends beyond the open top end 30 of the tubular storage container 12, allowing a golfer to easily grasp the sand trap rake 20 and pull it out of the tubular storage container 12.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

PARTS LIST 10 sand trap rake and storage apparatus
12 tubular storage compartment
13 hinge
14 cover
15 O-ring seal
16 spring top
18 spring
20 sand trap rake
22 handle
23 textured grip
24 rake head
26 spaced, parallel tines
30 open top end
32 closed bottom end
34 first operating position
36 second storage position
38 grip end of handle
40 head end of handle
42—aperture
44—base portion
46—threaded post
48—midpoint
50—hand knob

What is claimed is:

1. A rake apparatus, comprising: a) a rake handle having a grip end and a head end, with an aperture extending perpendicular to the length of the handle at the head end; b) a rake head with a base, a threaded post extending from a midpoint of the base on one side of the base, and a plurality of spaced, parallel side-by-side tines perpendicularly extending from the base on the side opposite the threaded post, the threaded post sized to extend through the aperture in the head end of the handle, c) a hand knob threadably secured to the threaded post, said hand knob selectively loosened about the threaded post to selectively pivot the rake head to any position relative to the handle ranging between and including a first operating position perpendicular to the handle and a second storage position parallel to the handle, and said hand knob selectively tightened about the threaded post to secure the rake head to the handle in the selected position, said sand trap rake being stored in a tubular storage compartment, said storage compartment having a diameter slightly larger than said rake head and rake handle lying side by side in said second storage position measured in the direction of the longitudinal extension of said tines and having a closed end and an open end, said tubular storage compartment being sized to fully receive said sand trap rake when said sand trap rake is in said second storage position.

2. The rake apparatus of claim 1, wherein a cover with a hinge means is pivotally attached to an edge of said open end of said tubular storage compartment.

3. The rake apparatus of claim 2, wherein a releasable fastening means is used to releasably secure said cover to said open end of the tubular storage compartment.

4. The rake apparatus of claim 1, wherein a compression spring is disposed inside the tubular storage compartment adjacent to the closed end, the compression spring being sized to partially bias the rake towards the open end, for ease of removal of the rake from the tubular storage compartment.

5. The apparatus of claim 4, wherein a spring top is slidably received adjacent to said spring within said tubular storage compartment.

6. The rake apparatus of claim 2, wherein said tubular storage compartment is vertically secured in a hole, with said cover extending above a ground surface in proximity to a sand trap on a golf course.

7. The rake apparatus of claim 1, wherein said hand knob is loosened to pivot said rake head to a selected arcuate position in relation to said handle, and said hand knob is tightened to releasably secure said rake head in said selected arcuate position to angle said rake head for either right hand or left hand use.

8. The rake and storage apparatus of claim 2, wherein said tubular storage compartment and said cover are made of PVC material.

9. A rake apparatus of claim 6, wherein an O-ring seal is provided around the edge of said open end of the tubular storage compartment to provide a seal between said cover and said open top end of said tubular storage compartment.

10. A rake apparatus of claim 1, wherein the apparatus is made of at least one of: a metal, a plastic and a wood, and combinations thereof.

11. The rake apparatus of claim 1, wherein a textured hand grip is provided on the grip end of said handle.

12. A combination rake and storage apparatus, comprising: a) a sand trap rake having a handle end, and a head end at the end opposite the handle end, a textured grip at the handle end, with an aperture extending perpendicular to the length of the handle at the head end; b) a rake head with a base portion, a threaded post extending from a midpoint of the base portion on one side of the base portion, with a plurality of tines extending in spaced, side-by-side alignment perpendicular to the base portion on the side opposite said threaded post; said threaded post sized to extend through said aperture in said head end of said handle; c) a hand knob threadably secured to said threaded post, said hand knob selectively loosened about said threaded post to selectively pivot the rake head to any position relative to said handle ranging between and including a first operating position perpendicular to said handle and a second storage position parallel to said handle, and said hand knob selectively tightened about said threaded post to secure said rake head to said handle in the selected position; d) a tubular storage compartment being sized to fully receive said rake when said rake is pivoted into the second storage position, said tubular storage compartment having an open top end and a closed bottom end, said rake being stored in said tubular storage compartment in said second storage position, having a diameter of said rake head and a straight portion of said rake handle laying side by side measured in the direction of the longitudinal extension of said tines, said tubular storage compartment having a closed end and an open end and a diameter and length to fully receive said rake therein when said rake is in said second storage position; e) a cover hingedly attached to an edge of said open top end of said tubular storage compartment, f) a compression spring positioned inside the tubular storage compartment adjacent to said closed end of the tubular storage compartment, said compression spring being sized to partially bias said rake toward said cover for ease of removal of said rake from said tubular storage compartment.

13. The combination rake and storage apparatus of claim 12, wherein said tubular storage compartment is vertically secured in a hole in the ground, with the cover extending above the ground surface in proximity to a sand trap on a golf course.

14. The combination rake and storage apparatus of claim 12, wherein a spring top is located directly above the spring within the tubular storage compartment adjacent to the compression spring, and when the cover is opened, said compression spring biases said rake to extend a portion of said rake beyond said open end of the tubular storage apparatus, for ease of removal of said and rake from said tubular storage compartment.

15. The combination rake and storage apparatus of claim 12, wherein an O-ring seal is provided around said edge of said open end of said tubular storage compartment, to provide a seal between said cover and said open top end of said tubular storage compartment.

16. A combination rake and storage apparatus, comprising: a) a rake having a handle end, and a head end at the end opposite said handle end, a textured grip at said handle end, with an aperture extending perpendicular to the length of said handle at said head end; b) a rake head with a base portion, a threaded post extending from a midpoint of said base portion on one side of said base portion, with a plurality of tines extending in spaced, side-by-side alignment perpendicular to said base portion on the side opposite said threaded post; said threaded post sized to extend through said aperture in said head end of said handle; c) a hand knob threadably secured to said threaded post, said hand knob selectively loosened about said threaded post to selectively pivot said rake head to any position relative to said handle ranging between and including a first operating position perpendicular to said handle and a second storage position parallel to said handle, and said hand knob selectively tightened about said threaded post to secure said rake head to said handle in the selected position; d) a tubular storage compartment sized to fully receive said rake when the said rake is pivoted into said second storage position, said tubular storage compartment having an open top end and a closed bottom end, said rake being stored in said tubular storage compartment in said second storage position, having a diameter of said rake head and a straight portion of said rake handle laying side by side measured in the direction of the longitudinal extension of said tines, said tubular storage compartment having a closed end and an open end and a diameter and length to fully receive said rake therein when said rake is in said second storage position; e) a cover hingedly attached to an edge of said open top end of said tubular storage compartment, f) a compression spring positioned inside said tubular storage compartment adjacent to said closed end of said tubular storage compartment, said compression spring being sized to partially bias said rake toward said cover for ease of removal of said rake from said tubular storage compartment; and g) an O-ring seal provided around said edge of said open end of said tubular storage compartment, to provide a seal between said cover and said open top end of said tubular storage compartment.

17. The combination rake and storage apparatus of claim 16, wherein said tubular storage compartment is vertically secured in a hole in the ground, with said cover extending above the ground surface in proximity to a sand trap on a golf course.

18. The combination rake and storage apparatus of claim 16, wherein said rake and said tubular storage compartment are each made of at least one material selected from: a metal, a plastic, a wood, and combinations thereof.

* * * * *